Patented Nov. 10, 1942

2,301,650

UNITED STATES PATENT OFFICE 2,301,650

PRODUCTION OF PURE SULPHUR DIOXIDE

Nicolay Titlestad, White Plains, N. Y., assignor to Chemical Construction Corporation, New York, N. Y., a corporation of Delaware No Drawing. Application January 7, 1941, Serial No. 373,433

2 Claims. (Cl. 23—177)

This invention relates to the production of a substantially pure sulphur dioxide gas free from oxides of nitrogen and suitable for conversion to strong sulphuric acid by the contact process from impure hydrogen sulphide gases. In its broader aspects the invention also includes the manufacture of strong sulphuric acid or oleum from sulphur dioxide gases obtained from this source.

It is well known that hydrogen sulphide can be recovered from a wide range of industrial gases, such as coke oven gas, gases from oil refineries, and the like. In U. S. Patent No. 2,003,442 there is described a process for the manufacture of sulphuric acid from highly concentrated hydrogen sulphide gases, but up to the present time no satisfactory method has been devised for utilizing the weaker and less pure hydrogen sulphide gases that are usually obtained from the above sources. It is a principal object of the present invention to provide a method for obtaining a substantially pure sulphur dioxide gas from impure hydrogen sulphide gases containing greater or lesser amounts of non-combustible diluents. A further and more specific object of the invention resides in the provision of a method of obtaining a pure sulphur dioxide gas from hydrogen sulphide gases containing non-combustible diluents, which gases are contaminated by combustible nitrogen compounds such as ammonia, cyanides, thiocyanates and the like.

Many industrial gases containing hydrogen sulphide, such as those extracted from coke oven gas by the use of phenolates, ethanolamine and the like, as well as the "sour" gases obtained from petroleum fractions, are diluted by carbon dioxide or other non-combustible gases and are also contaminated by ammonia, cyanides and other combustible nitrogen compounds. The hydrogen sulphide content of such gases can be oxidized to sulphur dioxide by burning with air, with or without the use of combustion catalysts, but under ordinary circumstances a complete combustion or decomposition of the nitrogen compounds is not obtained and nitric oxides are found in the gases leaving the gas cooling equipment. Regardless of the type of combustible nitrogen compound in the gases these nitric oxides, when introduced into a contact sulphuric acid process, will always produce a sulphuric acid containing small quantities of nitric acid or nitrogen peroxides which cause both corrosion of the equipment and absorption difficulties in the absorption system of the sulphuric acid plant.

I have now discovered that the difficulties due to the presence of combustible nitrogen compounds in dilute hydrogen sulphide gases are overcome when the combustion temperature used in burning the hydrogen sulphide to sulphur dioxide is artificially increased by preheating the hydrogen sulphide gases. I have found that in all cases a combustion temperature substantially higher than 2000° F. is necessary to decompose completely such nitrogen compounds as ammonia, hydrocyanic acid and ammonium cyanide and such high combustion temperatures are not reached in the burner when the hydrogen sulphide gas contains any substantial quantities of non-combustible gases such as carbon dioxide.

It is known that pure hydrogen sulphide when burned with the amount of air theoretically necessary for complete combustion will produce a furnace temperature higher than 2000° F. However, if the hydrogen sulphide contains any substantial amount of carbon dioxide the furnace temperature falls below 2000° F., if the necessary excess of oxygen for combustion is to be maintained, and combustible nitrogen compounds that may be present in the hydrogen sulphide are not completely decomposed. Thus, for example, a hydrogen sulphide gas containing 30% by volume of carbon dioxide and small amounts of ammonia and hydrocyanic acid, when burned with a slight excess of air over that theoretically necessary for complete combustion produced a furnace temperature of about 2000° F., and appreciable quantities of nitric oxides were found in the stack gases of the furnace. Upon preheating this gas mixture, including the air used for combustion, to such an extent that a furnace temperature of 2400° F. was obtained, the presence of oxides of nitrogen in the stack gases was completely eliminated.

From the foregoing it is evident that a furnace temperature substantially higher than 2000° F., and preferably on the order of 2400° F., is necessary in order to decompose all the combustible nitrogen compounds that may be present in a hydrogen sulphide gas, and my invention in its broader aspects includes the step of preheating dilute hydrogen sulphide gases containing such combustible nitrogen compounds as impurities to the extent necessary to obtain these furnace temperatures upon combustion with substantially the theoretical amount of air. All the heat units necessary for preheating may be introduced by preheating the hydrogen sulphide gases alone, or by heating the combustion air alone, but I prefer to impart the necessary degree of preheat by heating the hydrogen sulphide gas. I have found that the proper preheating temperature for any hydrogen sulphide gas containing a non-combustible diluent can be expressed by the equation $$\frac{\text{non-combustible gas}}{\text{total amount of gas}} \times 2000° \text{ F.} = \text{preheating temp.}$$

For example, if the gas contains 50% non-combustibles by volume, the gas should be preheated to: $.5 \times 2000°$ F. $= 1000°$ F. as a minimum. Obviously, a higher degree of preheat may be supplied in special cases, as where the gases contain an unusually large quantity of combustible nitrogen compounds, but for all practical purposes the above equation is valid.

From the foregoing it is apparent that my invention in its broader aspects is directed to a process of preparing a substantially pure sulphur dioxide gas, free from oxides of nitrogen, from hydrogen sulphide gases containing combustible nitrogen compounds and also containing non-combustible diluents by supplying sufficient preheat to the hydrogen sulphide gas mixture to artificially increase the furnace temperature upon combustion with air to a range substantially higher than 2000° F. and preferably on the order of 2400° F. The preheating may be supplied in any suitable manner, as by passing the hydrogen sulphide gas, or the combustion air, or both, through a suitable gas fired preheater or by heat exchange with the stack gases leaving the combustion furnace in which the hydrogen sulphide is burned. The resulting sulphur dioxide gases, being free from oxides of nitrogen, may then be admixed with further quantities of air and passed over a sulfuric acid catalyst for oxidation to sulphur trioxide, which may then be absorbed in sulphuric acid in the usual manner for the manufacture of strong sulphuric acid or oleum.

What I claim is:

1. A method of producing a sulphur dioxide gas free from oxides of nitrogen from a hydrogen sulphide gas containing combustible nitrogen compounds selected from the group consisting of ammonia and cyanides and also containing non-combustible diluents which comprises the steps of imparting to said hydrogen sulphide gas an amount of sensible heat such that upon combustion with air the combustion temperature will be substantially above 2000° F. and burning said preheated gas with air.

2. A method of producing a sulphur dioxide gas free from oxides of nitrogen from a hydrogen sulphide gas containing combustible nitrogen compounds selected from the group consisting of ammonia and cyanides and also containing non-combustible diluents which comprises the steps of imparting to said hydrogen sulphide gas an amount of preheat not less than that defined by the equation $$\frac{\text{non-combustible gas}}{\text{total amount of gas}} \times 2000° \text{ F.} = \text{preheating temp.}$$

and burning said preheated gas with air.

NICOLAY TITLESTAD.